E. F. LEMOINE.
MILL-PICK.
No. 185,114. Patented Dec. 5, 1876.
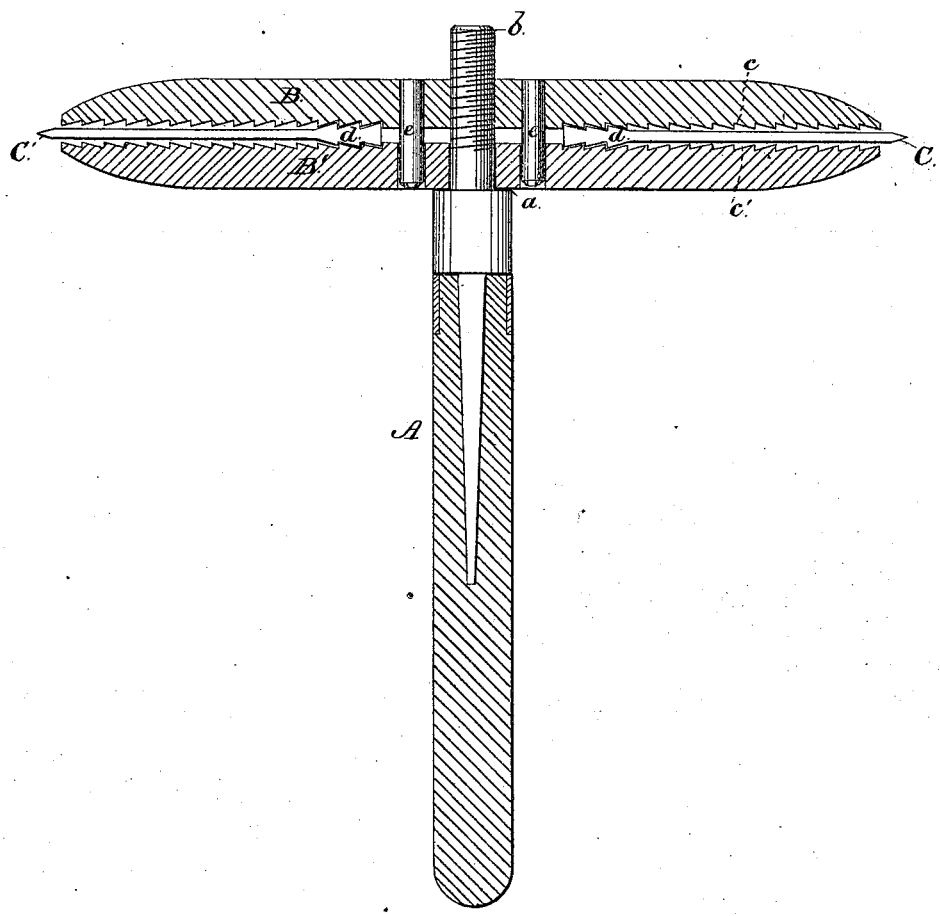
WITNESSES:
W. W. Hollingsworth
John A. Kernon
INVENTOR:
E. F. Lemoine
BY
ATTORNEYS.

UNITED STATES PATENT OFFICE.

EDGAR F. LEMOINE, OF EMMERTON, VIRGINIA.

IMPROVEMENT IN MILL-PICKS.

Specification forming part of Letters Patent No. 185,114, dated December 5, 1876; application filed October 2, 1876.

*To all whom it may concern:*

Be it known that I, EDGAR F. LEMOINE, of Emmerton, in the county of Richmond and State of Virginia, have invented a new and Improved Mill-Pick; and I do hereby declare that the following is a full, clear, and exact description of the same, reference being had to the accompanying drawing, forming part of this specification, in which the figure is a sectional view.

My invention relates to certain improvements upon that form of mill-pick in which the entire length of the blade is utilized by being adjusted farther out as it wears away, the same being effected by forming ratchet-teeth upon the inner ends of the blades, and constructing corresponding notches or depressions in the clamping-jaws, in which notches the teeth of the blades are transferably adjustable.

My improvement consists in the particular means for clamping the jaws, in which a screw-threaded stem of the shank enters a female thread of the upper jaw, and holds the jaws together, while guide-pins prevent the jaws from turning on each other. With this means of clamping the jaws the latter do not become loose, and the blades can never become accidentally detached, as when a key is used, which, from the impact of the blows, is readily displaced.

In the accompanying drawing, A represents the handle, which may be constructed of metal, or of a metal shank and tang, and a wooden hand-hold, as shown, the latter forming a more comfortable tool to handle in cold weather. The end of said handle is constructed with a shoulder, $a$, and a projecting stem, $b$, the lower portion of which stem next to the shoulder is plain and the extremity screw-threaded. Upon this stem are arranged the two clamping-jaws B B', which secure the picking-blades C C upon each side of the handle. The said jaws have upon their inner adjacent faces transverse ratchet-teeth or notches $c\ c'$, the shoulders of which face outwardly, while the blades have transverse ratchet-teeth $d$ upon each side, the shoulders of which face inwardly toward the handle, and, when the jaws are clamped, abut against the shoulders of the teeth upon the same. This construction and arrangement, it will be seen, permits of the adjustment of the blades farther out as they wear away, or closer in when it is desired to stiffen the blade.

The jaws are clamped upon the blades and attached to the handle by the following means: The upper jaw B is perforated with a screw-threaded hole, corresponding in size to the screw-threaded portion of the stem $b$, while the lower jaw is perforated with a plain hole, corresponding to the plain portion of the stem. Through these holes in the jaws the stem of the handle is inserted, and as the handle is screwed up the upper jaw is drawn down by the screw against the lower jaw, which abuts against the shoulder $a$ of the handle, and the blade is thus firmly clamped between the two jaws. The latter are prevented from turning upon each other by the two guide-studs $e\ e$, which are attached to the upper jaw and pass through holes in the lower one. This form of connection, it will be seen, is simple and secure, and far superior to the use of keys, which are liable to jar out from the repeated blows.

Having thus described my invention, what I claim as new is—

The handle having shoulder $a$ and screw-threaded stem $b$, in combination with the toothed blades C and the notched jaws B B', the one jaw, B, being perforated with a screw-threaded hole and having pins $e$, and the other jaw perforated with a plain hole for the stem, and having guide-holes for the pins, substantially as and for the purpose described.

EDGAR F. LEMOINE.

Witnesses:
O. M. LEMOINE,
JNO. S. BRAXTON.